US008193484B2

(12) United States Patent
Quarmby et al.

(10) Patent No.: US 8,193,484 B2
(45) Date of Patent: Jun. 5, 2012

(54) METHOD AND APPARATUS FOR AUTOMATIC ESTIMATION OF DETECTOR GAIN IN A MASS SPECTROMETER

(75) Inventors: Scott T. Quarmby, Round Rock, TX (US); Michael W. Senko, Sunnyvale, CA (US)

(73) Assignee: Thermo Finnigan LLP, San Jose, CA (US)

( * ) Notice: Subject to any disclaimer, the term of this patent is extended or adjusted under 35 U.S.C. 154(b) by 142 days.

(21) Appl. No.: 12/849,733

(22) Filed: Aug. 3, 2010

(65) Prior Publication Data

US 2012/0032072 A1 Feb. 9, 2012

(51) Int. Cl.
*H01J 49/00* (2006.01)
*B01D 59/44* (2006.01)

(52) U.S. Cl. ......... 250/281; 250/282; 250/286; 250/397

(58) Field of Classification Search .................. 250/281, 250/282, 286, 397
See application file for complete search history.

(56) References Cited

U.S. PATENT DOCUMENTS 5,572,022 A 11/1996 Schwartz et al.
6,265,714 B1 * 7/2001 Shimomura .................. 250/281
6,982,413 B2 * 1/2006 Knecht et al. ................. 250/281
7,047,144 B2 * 5/2006 Steiner ............................ 702/64
7,109,474 B2 * 9/2006 Schwartz ...................... 250/282
7,238,936 B2 * 7/2007 Okamura et al. ............. 250/284

OTHER PUBLICATIONS

William J. Fies, Jr., "A Method for Measuring the Gain of an Electron Multiplier," Int. J. Mass Spectrom. Ion Processes, 82 (1988), pp. 111-129.
SGE Analytical Science, "Electron Multipliers," product information, http://www.sge.com/products/electron-multipliers, pp. 1-2.
SGE Analytical Science, "How Electron Multipliers work," http://www.sge.com/products/electron-multipliers/how-electron-multipliers-work, pp. 1-2.
SGE Analytical Science, "Electron Multipliers—Technical Articles," 1 page, http://www.sge.com/documents/documents/applications-information/technical-articles/electron-multipliers.
Detector Technology, Inc., DeTech Multipliers, "Technical Notes," http://www.detechinc.com/notes.htm#top, pp. 1-9.

* cited by examiner

*Primary Examiner* — Nikita Wells
(74) *Attorney, Agent, or Firm* — Haynes and Boone, LLP; Charles B. Katz

(57) ABSTRACT

A method and apparatus involve: performing a plurality of analytical scans during normal operation of a mass spectrometer having a detection section, wherein data is generated during the analytical scans in a manner that includes use of the detection section; and automatically evaluating the data from the analytical scans to monitor whether an actual gain of the detection section changes over time.

20 Claims, 13 Drawing Sheets

170

190

METHOD AND APPARATUS FOR AUTOMATIC ESTIMATION OF DETECTOR GAIN IN A MASS SPECTROMETER

TECHNICAL FIELD

This invention relates in general to mass spectrometers and, more particularly, to techniques for detecting changes in the gain of a detector in a mass spectrometer.

BACKGROUND

Existing mass spectrometers have an ion source that produces ions that are processed by a mass analyzer and eventually detected by a detection system. During operation, the mass spectrometer performs analytical scans that generate data. To ensure that the mass spectrometer generates accurate and consistent data during operation, and optimizes signal-to-noise ratios, a gain of the detection system is often calibrated to an optimum value before performing the analytical scans. Even so, during operation of the mass spectrometer, the detection system ages and its gain changes, leading to inaccurate and inconsistent data. A conventional approach for addressing degradation of the detection system gain involves periodic, manual initiation of a gain determination and calibration of the detection system. Gain determination and calibration are traditionally carried out only during downtime, when the mass spectrometer is not engaged in normal operation. However, users do not always do this because, unfortunately, it can be more cost- and time-effective to allow the mass spectrometer to continuously run for long periods of times, such as several days, without periodically stopping the mass spectrometer to carry out the gain determination and calibration. Accordingly, although existing approaches to measuring and calibrating gain of the detection system in a mass spectrometer have been generally adequate for their intended purposes, they have not been entirely satisfactory in all respects.

SUMMARY

One of the broader forms of the invention involves a method that includes: performing a plurality of analytical scans during normal operation of a mass spectrometer having a detection section, wherein data is generated during the analytical scans in a manner that includes use of the detection section; and automatically evaluating the data from the analytical scans to monitor whether an actual gain of the detection section changes over time.

Another of the broader forms of the invention involves an apparatus including a mass spectrometer that has a detection section and a control section. The detection section has an actual gain. During normal operation of the mass spectrometer, the control section: causes the mass spectrometer to perform a plurality of analytical scans that generate data in a manner that includes use of the detection section, and automatically evaluates the data from the analytical scans to monitor whether the actual gain of the detection section changes over time.

DETAILED DESCRIPTION

Figure 1:
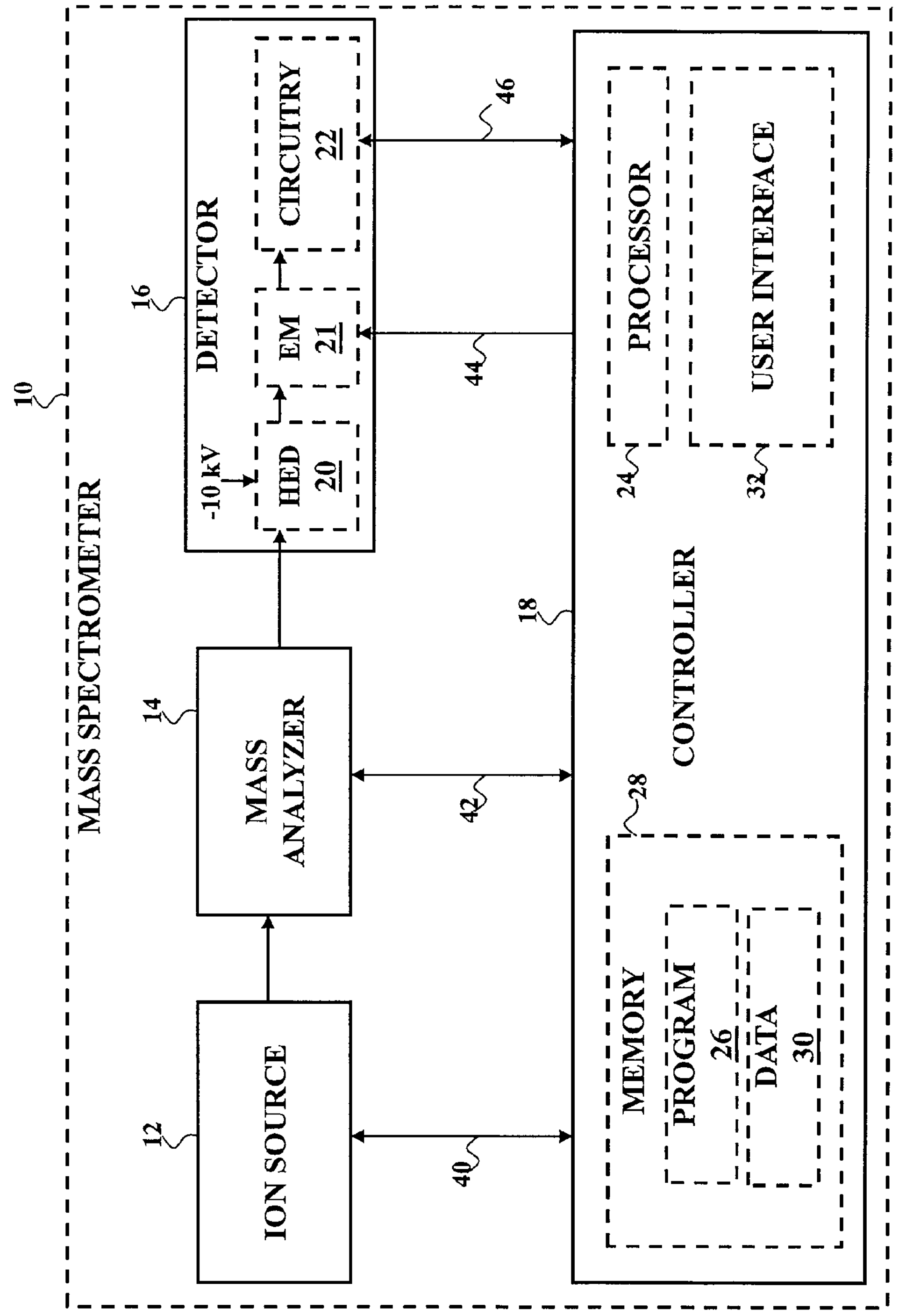
FIG. 1 is a block diagram of an apparatus that is a mass spectrometer that embodies various aspects of the invention.

FIG. 1 is a block diagram of an apparatus that is a mass spectrometer (MS) 10 that embodies aspects of the invention. The mass spectrometer 10 includes an ion source 12, a mass analyzer 14, a detector 16, and a controller 18. FIG. 1 is not a comprehensive diagram of the entire mass spectrometer. Instead, for simplicity and clarity, FIG. 1 shows only selected portions of the overall apparatus that facilitate an understanding of aspects of the present invention.

The ion source 12 is a type of device that is known in the art and, in the disclosed embodiment, is a commercially-available device. The ion source 12 produces ions from a sample material using electron ionization (EI). Alternatively, the ionization technique could be chemical ionization (CI) or atmospheric pressure ionization (API) (for example, electrospray ionization (ESI) or matrix-assisted laser desorption ionization (MALDI)). The ion source 12 outputs or delivers the resulting ions as an ion beam to the mass analyzer 14. The ion source 12 includes various elements for delivering the resulting ions to the mass analyzer 14. For example, in the disclosed embodiment, the ion source 12 includes a not-illustrated focusing lens system, where differential voltages are applied to elements of the focusing lens system to control an intensity of the ion beam.

The mass analyzer 14 is a type of device that is known in the art and, in the disclosed embodiment, is a commercially-available trapping mass analyzer. The trapping mass analyzer accumulates and confines the ions received from the ion source 12 within a chamber where they are subjected to electric and/or magnetic fields to pass the ions to the detector 16 in order of their mass-to-charge ratio (m/z). In the illustrated embodiment, the trapping mass analyzer is a linear quadrupole ion trap, but the techniques disclosed herein are not limited to use with a linear quadrupole ion trap. For example, the trapping mass analyzer could alternatively be a three-dimensional (3D) quadrupole ion trap, an ion cyclotron resonance (ICR) mass analyzer, an orbitrap mass analyzer, or other trapping mass analyzer. In yet another alternative, the mass analyzer 14 could be a non-trapping (or beam) mass analyzer, such as a quadrupole mass filter. The non-trapping mass analyzer continuously moves the ions received from the ion source 12 through the mass analyzer 14 and applies various electric and/or magnetic fields to effect the separation of the ions according to their m/z before passing the ions to the detector 16. The non-trapping mass analyzer could alternatively be a magnetic sector mass analyzer, a time-of-flight (TOF) mass analyzer, or other non-trapping mass analyzer.

The detector 16 is a type of device that is known in the art. The detector 16 detects ions and measures an ion intensity (quantity) of the ions received from the mass analyzer 14, at each of a variety of different mass-to-charge ratios. The detector 16 generates an electrical signal that corresponds to the ion intensity detected by the detector 16, and the signal is transmitted to the controller 18 for processing. In the disclosed embodiment, the detector 16 includes a high energy conversion dynode (HED) 20, an electron multiplier (EM) 21, and circuitry 22, such as an electrometer and associated electronic circuitry. Alternatively, the detector 16 could include other detection components as known in the art. The HED 20 converts positive ions received from the mass analyzer 14 into electrons. In the depicted embodiment, the HED 20 is a −10 kV HED (or could be a +10 kV HED for negative ions). The electrons are then input into the EM 21 for amplification. In the disclosed embodiment, the EM 21 is a discrete-dynode EM. The discrete-dynode EM includes a series of dynodes at increasing voltages. Charged particles, such as the electrons received from HED 20, strike the first dynode and generate secondary electrons through the impact, and then the initial electrons along with the secondary electrons are accelerated toward the next dynode, where they create further electrons through their impact, and so on, thereby creating a cascade of electrons and multiplying the incoming current. The number of secondary electrons depends on the type of incident particle, its energy, and characteristics of the incident surface. The electron cascade is then detected and processed by the circuitry 22, such as the electrometer and associated electronic circuitry. The detector 16 has a gain that varies in response to an output 44 from the controller 18. The output 44 carries a voltage that serves as a gain control signal. The HED 20, EM 21, and circuitry 22 all contribute to the gain of the detector 16, however, for purposes of the following discussion, references to the gain of the detector 16 will mean the combined gain of the HED 20 and EM 21. The combined gain of the HED 20 and EM 21 is varied in response to the voltage at the output 44. More specifically, the voltage of the gain control signal serves as a multiplier voltage, or cathode voltage, of the EM 21 to control the gain of the EM 21.

The controller 18 includes circuitry of a known type, and is operatively coupled to the ion source 12, mass analyzer 14, and detector 16. The controller 18 includes a processor 24 of a type known in the art, such as a digital signal processor (DSP). The processor 24 could alternatively be a microcontroller, field-programmable gate array (FPGA), or some other form of digital processor. As another alternative, the processor 24 could be replaced with a hardwired circuit. The processor 24 executes a program 26 that determines how the controller 18 controls components of the mass spectrometer 10. The program 26 is based on software that is known in the art, but that has been modified to include some aspects of the invention that are discussed in detail below. The controller 18 further includes memory 28 for storing the program 26, data 30, and other information associated with the operation and functionality of the mass spectrometer 10. In the disclosed embodiment, the memory 28 is a tangible controller-readable medium. The tangible controller-readable medium can be an electronic, magnetic, optical, electromagnetic, infrared, semiconductor, propagation, or other type of medium. The data 30 includes data collected or processed from the ion source 12, mass analyzer 14, and detector 16 during analytical scans performed by the mass spectrometer 10. The program 26 also processes the data 30 associated with the analytical scans.

The controller 18 includes a user interface 32 to provide interaction between a user (or operator) of the mass spectrometer 10 and the controller 18. The controller 18 interacts with the user via the user interface 32 by visual, auditory, tactile, and/or other sensory type communication. For example, the user interface 32 can include a display device, such as a cathode ray tube (CRT) or liquid crystal display (LCD) monitor, for displaying information to the user. The user interface 32 can also include a keyboard, pointing device, such as a mouse or a trackball, or some other device that allows the user to provide input to the controller 18.

The controller 18 includes interfaces 40 and 42 that communicate with the ion source 12 and the mass analyzer 14, respectively, for transmitting and receiving data. The interfaces 40 and 42 also include control outputs that allow the controller 18 to control the ion source 12 and mass analyzer 14, respectively. For example, the controller 18 can output control signals over interface 40 to adjust and control an ionization voltage and accelerating voltage of the ion source 12, such that the intensity of the ion beam is controlled. The controller 18 can also output control signals over interface 42 to adjust and control voltages of the mass analyzer 14, such that at a given point in time, only ions with a specified m/z pass from the mass analyzer 14 to the detector 16. In the disclosed embodiment, the controller 18 outputs control signals over interface 42 to regulate an ion population collected by the mass analyzer 14 during the analytical scans. The controller 18 also produces the output 44 that controls the EM 21 of detector 16. The output 44 provides the gain control signal to the EM 21, such that the gain of the detector 16 is set to a suitable value. An interface 46 between the controller 18 and detector 16, specifically circuitry 22, allows communication for transmitting and receiving control signals and data. The interfaces 40, 42, and 46 and output 44 can be provided via wired transmission. Alternatively, the interfaces and outputs can be provided via wireless transmission, or alternatively, a combination of wired and wireless transmission.

Operation of the mass analyzer 10 will now be described. As noted above, in the depicted embodiment, the mass analyzer 10 is a trapping mass analyzer, and thus the operation will be described with reference to a trapping mass analyzer. This is a non-limiting example, and the techniques described below can also be implemented in other mass analyzers. In operation, the mass spectrometer 10 conducts analytical scans. During the analytical scans, the controller 18 supplies control signals to the ion source 12 via interface 40, such that ions are generated from an unknown sample material and travel from the ion source 12 to the mass analyzer 14. The controller 18 supplies control signals to the mass analyzer 14 via interface 42 causing the mass analyzer 14 to scan across a range of m/z and selectively filter ions according to their m/z. At any given point in time during a scan, the ions being provided to the detector 16 have a selected m/z, and for simplicity in the present discussion it is assumed that the mass spectrometer 10 is operating in a mode where the selected m/z progressively increases (or progressively decreases) during the scan. Alternatively, however, the selected m/z does not necessarily have to progressively increase (or decrease), but could instead be either constant or discontinuous, for example where the mass analyzer 10 is set to a selected ion monitoring (SIM) mode, or to a selected reaction monitoring (SRM) mode. The detector 16 detects an ion intensity (quantity) for the ions of each m/z as received from the mass analyzer 14. In particular, the ions impinge on the HED 20, which converts positive ions to electrons. The electrons then impinge on the EM 21, where the initial electrons are multiplied into an electron cascade. The circuitry 22, such as the electrometer and associated electronic circuitry, then detect the electron cascade, generating an electrical signal corresponding to the detected ion intensity. The detected ion intensity information is sent through the interface 46 to the controller 18. The controller 18 saves this data as part of the data 30. The controller 18 processes the data and can generate mass chromatograms. For example, a mass chromatogram can represent the ion intensity of a particular m/z over time. Multiple mass chromatograms can be generated during the analytical scans for the range of m/z.

Prior to the analytical scans, tuning and calibrating processes are performed on the mass spectrometer 10 to ensure that the mass spectrometer 10 will generate accurate and consistent data when performing the analytical scans. As one aspect of this, for example, a detector gain calibration is performed so that the gain of the detector 16 is calibrated to a target gain, which is a predetermined, constant value that is specified by the manufacturer of the mass spectrometer 10. In the disclosed embodiment, when calibrating the gain of the detector 16, an assumption is made that the detection of an ion is a discrete, random event. From this assumption, statistical techniques are used to estimate the gain of the detector 16, as will be discussed in further detail below. The statistical techniques rely on the fact that a statistical variance of a measured ion beam intensity under appropriate conditions is ion statistics limited, in other words, controlled by Poisson statistics. Under these conditions, Poisson statistics dictate that a number of ions detected is related to the precision of the intensity measurements of the mass spectrometer 10. More specifically, the number of ions detected for a given m/z can be expressed by the following relationship:

$$\text{Number of } Ions_{m/z} = \frac{1}{RSD^2_{m/z}} \tag{1}$$

where $RSD_{m/z}$ is relative standard deviation of an ion beam intensity of the given m/z. In the disclosed embodiment, an intensity of the ion beam of the ion source 12 is tuned and adjusted to achieve an ion beam intensity that is ion statistics limited. In the disclosed embodiment, adjusting the ion beam intensity to produce about 10% RSD for a peak area of the ion beam intensity for a particular m/z provides an ion beam that is ion statistics limited.

Once the ion beam intensity is ion statistics limited, the detector gain is calibrated by determining a relationship between the detector gain and the multiplier voltage of the EM 21. For example, the gain of the EM 21 is measured at different multiplier voltages, and then the gain values and corresponding multiplier voltages are used to determine an equation that expresses the detector gain as a function of the multiplier voltage of the EM 21. In the disclosed embodiment, a non-linear fit is applied to the data so that the gain of the detector 16 is related to the multiplier voltage of the EM 21 by the equation:

$$\text{Detector Gain} = \text{Coef}_A(\text{MultplierVoltage} + \text{Coef}_B)^{\text{Coef}C} \tag{2}$$

where $\text{Coef}_A$, $\text{Coef}_B$, and $\text{Coef}_C$ are coefficients determined by the fit. Alternatively, other fitting methods could be used to arrive at an equation for converting between multiplier voltage and detector gain. From Equation (2), the detector 16 is calibrated to a target gain. More specifically, the controller 18 uses the gain control signal 44 to adjust the multiplier voltage of the EM 21 until the EM 21 is calibrated to the target gain.

The controller 18 regulates an ion population collected by the mass analyzer 14 during the analytical scans, using a technique called automatic gain control (AGC). It should be noted that, in a mass spectrometer, "AGC" does not actually involve true automatic gain control, but instead is a term of art meaning automatic ion population control. Before the analytical scans, a pre-scan is carried out by opening a gate of the ion trap of the mass analyzer 14 for a predetermined time interval, and then determining the population of ions collected from the ion source 12 in the mass analyzer 14 during that time interval. This ion population is typically referred to as total ion current (TIC). Based on the TIC determined for the pre-scan time interval, an ion injection time is determined by the controller 18 for use during the analytical scans. The ion injection time is determined with a goal of filling the ion trap to a point where it contains a desired number of ions or desired TIC, sometimes referred to as an AGC target value or AGC target ion population. In the disclosed embodiment, for each analytical scan, the controller 18 adjusts a gating time of the mass analyzer 14 via interface 42 to trap successive AGC target ion populations of about 50,000 ions of a sample material.

Analytical scans using the AGC target ion population are performed by the mass spectrometer 10. During use of the mass spectrometer 10, the EM 21 ages and the gain drops below the calibrated target gain, resulting in lower ion intensities detected. For example, during use, the dynodes of the EM 21 are being continuously bombarded by electrons, which degrades the dynodes and changes the gain of the EM 21. It is possible for the gain of the EM 21 to change rapidly. For example, a significant change in gain can sometimes occur in only a few hours of operation. Further, in the disclosed embodiment, since the controller 18 uses the AGC technique, the controller 18 relies on the ion intensities recorded by the detector 16 to do feedback control that ensures the number of ions of the sample material stored in the mass analyzer 14 for each analytical scan is the AGC target ion population. Accordingly, when the ion intensities reported by the detector 16 are lower than the actual ion intensities, because of aging for example, the controller 18 is erroneously led to believe that the mass analyzer 14 is receiving fewer ions from the ion source 12 than it really is. To compensate, the AGC carried out by the controller 18 therefore opens the gate of the mass analyzer 14 longer than it should, thus causing the mass analyzer 14 to receive more ions than it should, and thereby degrading data accuracy. Accurate knowledge of the detector gain is thus needed to produce accurate results, and to adequately control the number of ions stored in the mass analyzer 14 during the analytical scans.

A conventional approach for addressing the gain degradation of the detector 16 involves periodic, manual initiation of a gain determination and calibration of the detector 16. However, users do not always do this when they should because, unfortunately, it can be more cost- and time-effective to allow the mass spectrometer to continuously run for long periods of times, such as several days, without periodically stopping the mass spectrometer to carry out the gain determination and calibration. Under this traditional approach, gain determination and calibration are carried out only during downtime, when the mass spectrometer is not engaged in normal operation. In this regard, as used herein, the term "normal operation" means that the mass spectrometer is performing analytical scans and acquiring data for purposes other than, or in addition to, the determination of detector gain. During normal operation of the mass spectrometer, it is acquiring data under conditions that are typically non-ideal for gain determination, for example while an unknown sample is introduced at a non-constant rate. In accord with aspects of the present invention, the detector gain can be relatively accurately and reliably determined even under such non-ideal conditions, thereby making more efficient use of instrument time. In the disclosed embodiment, the data generated by the ion source 12, mass analyzer 14, detector 16, and controller 18 during normal operation, and information derived from that data, are processed and evaluated by the controller 18 to measure and monitor the gain of the detector 16 during normal operation, including determining an estimated gain of the detector 16 that is an estimate of the actual gain of the detector 16. It can then be determined whether the estimated gain is an acceptable value, and thus whether adjustments to the actual gain of the detector 16 of the mass spectrometer 10 should be made based on the estimated gain value.

In the disclosed embodiment, during normal operation of the mass spectrometer 10, analytical scans of an unknown sample material are performed by the mass spectrometer 10. More specifically, the mass analyzer 14 traps the AGC target ion population, specifically AGC target ion population of 50,000 ions of the sample material, and an analytical scan is performed on the AGC target ion population. This is done repeatedly for the sample material, and multiple analytical scans are performed on multiple AGC target ion populations of the sample material. Data is generated by the mass spectrometer 10 during the analytical scans. In the mass spectrometer art, it is customary to use the term "micro-scan" to refer to an individual scan, and to use the term "analytical scan" to refer to one or more micro-scans, for example three micro-scans, where the data for an "analytical scan" is the average of the data from its one or more micro-scans. Accordingly, for purposes of the discussion below, when discussing data generated by the mass spectrometer 10, or information derived from that data, references to data from an "analytical scan" will mean averaged data from three micro-scans (actual analytical scans). FIGS. 2-12 are graphs representing data generated by the mass spectrometer 10 during analytical scans of ions of the unknown sample material, or representing information derived from that data. These graphs are derived from data collected during analytical scans in the mode where ions provided to the detector 16 have a selected m/z that progressively increases (or progressively decreases) during the scan. Alternatively, however, suitable graphs could be derived from data collected during analytical scans in the SIM mode or the SRM mode. The graphs in FIGS. 2-12 are provided for illustration purposes only. The gain monitoring of the mass spectrometer 10, described below, can be performed solely with the generated data or derived information, without generating graphs.

Figure 2:
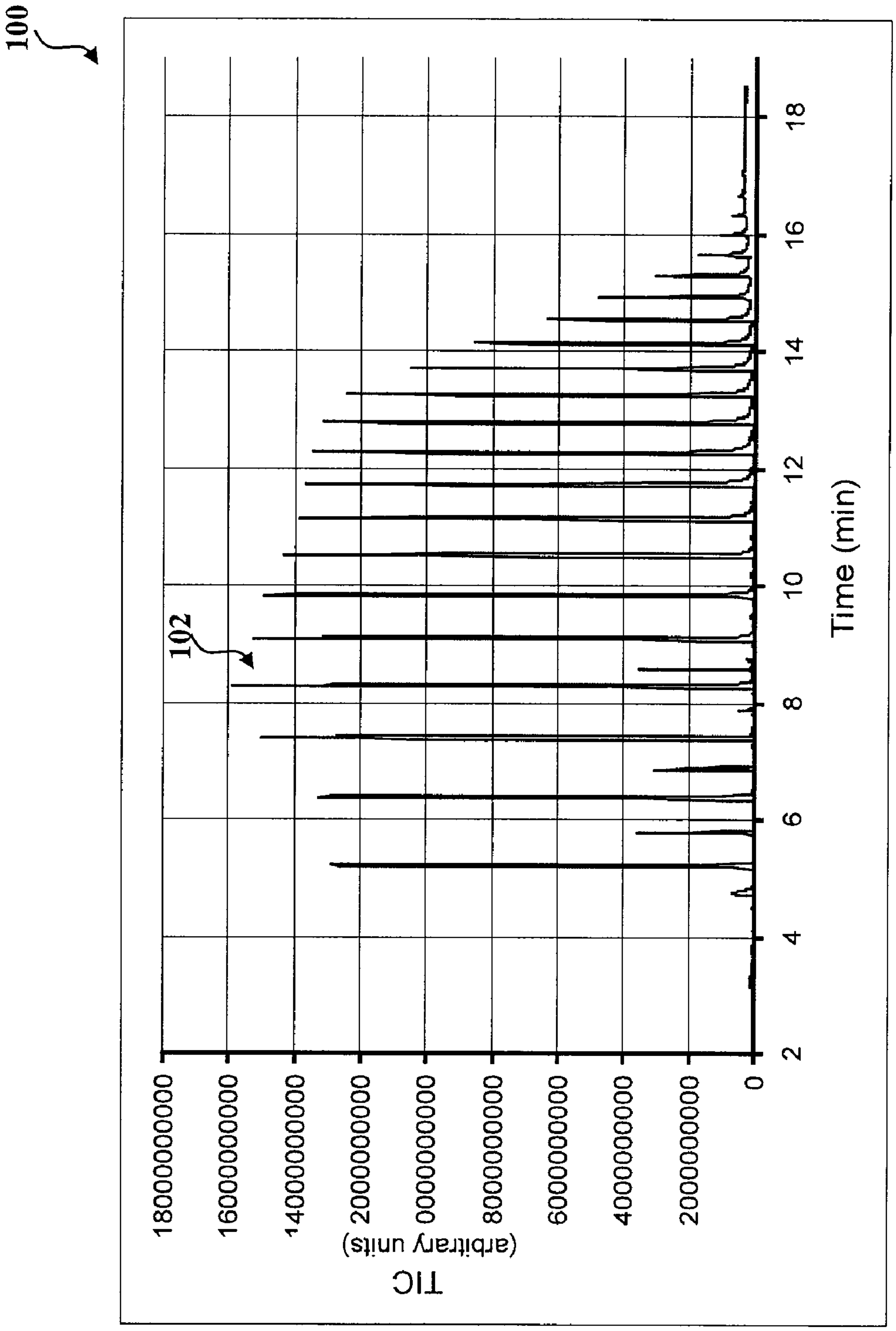
FIGS. 2-12 are graphs representing data generated by the mass spectrometer of FIG. 1 during operation, or representing information derived from that data.

The data generated during analytical scans yields information about the TIC of all the mass-to-charge ratios of the sample material. For example, the ion intensities for all mass-to-charge ratios detected in an analytical scan of the AGC target ion population can be added together to determine the total ion current (TIC) collected during the scan. FIG. 2 is a graph 100 showing a curve 102 that illustrates how the TIC of the AGC target ion population of an unknown sample material varies over time. In FIG. 2, the horizontal axis represents time in minutes, and the vertical axis represents ion counts (intensity), in arbitrary units. In FIG. 2, each point on the curve 102 represents an average TIC for three micro-scans, and thus, each point on the curve 102 represents the TIC of 150,000 ions (the AGC target ion population of 50,000 times three) at a given point in time.

Since the AGC target ion population is known and the TIC for the AGC target ion population is known, a number of ions of each m/z in the AGC target ion population can be determined. In the disclosed embodiment, a predicted number of ions and a statistical number of ions for each m/z of the sample material are determined. For simplicity, estimating the gain of the detector 16 will first be described with reference to a single m/z, particularly m/z 152.

As noted above, the ion intensities for a range of m/z are determined during analytical scans, and in the disclosed embodiment, the TIC of the AGC target ion population (FIG. 2) is known. From the TIC and an ion intensity of a particular m/z ($I_{m/z}$) of the AGC target ion population, the predicted number of ions of the particular m/z can be determined by the following equations:

$$\%\ TIC_{m/z} = \frac{I_{m/z}}{TIC} \tag{3}$$

$$\text{Predicted Number of } m/z \text{ Ions} = \%\ TIC_{m/z} \times AGC \text{ target ion population} \tag{4}$$

where % $TIC_{m/z}$ represents the ion intensity of the particular m/z as a percentage of TIC. The % $TIC_{m/z}$ thus provides information on how much the particular m/z makes up the AGC target ion population of the sample material.

Figure 3:
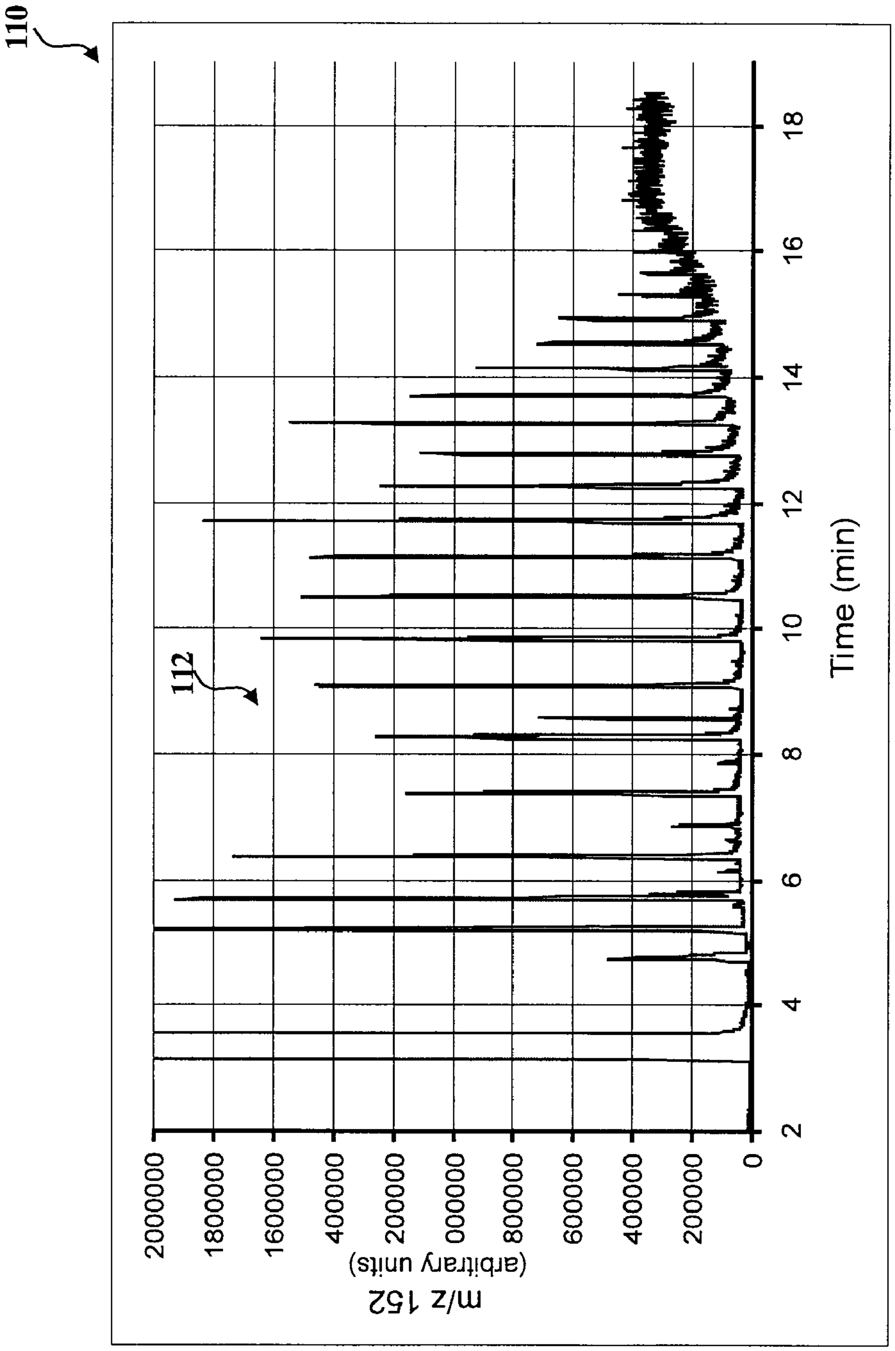
Figure 4:
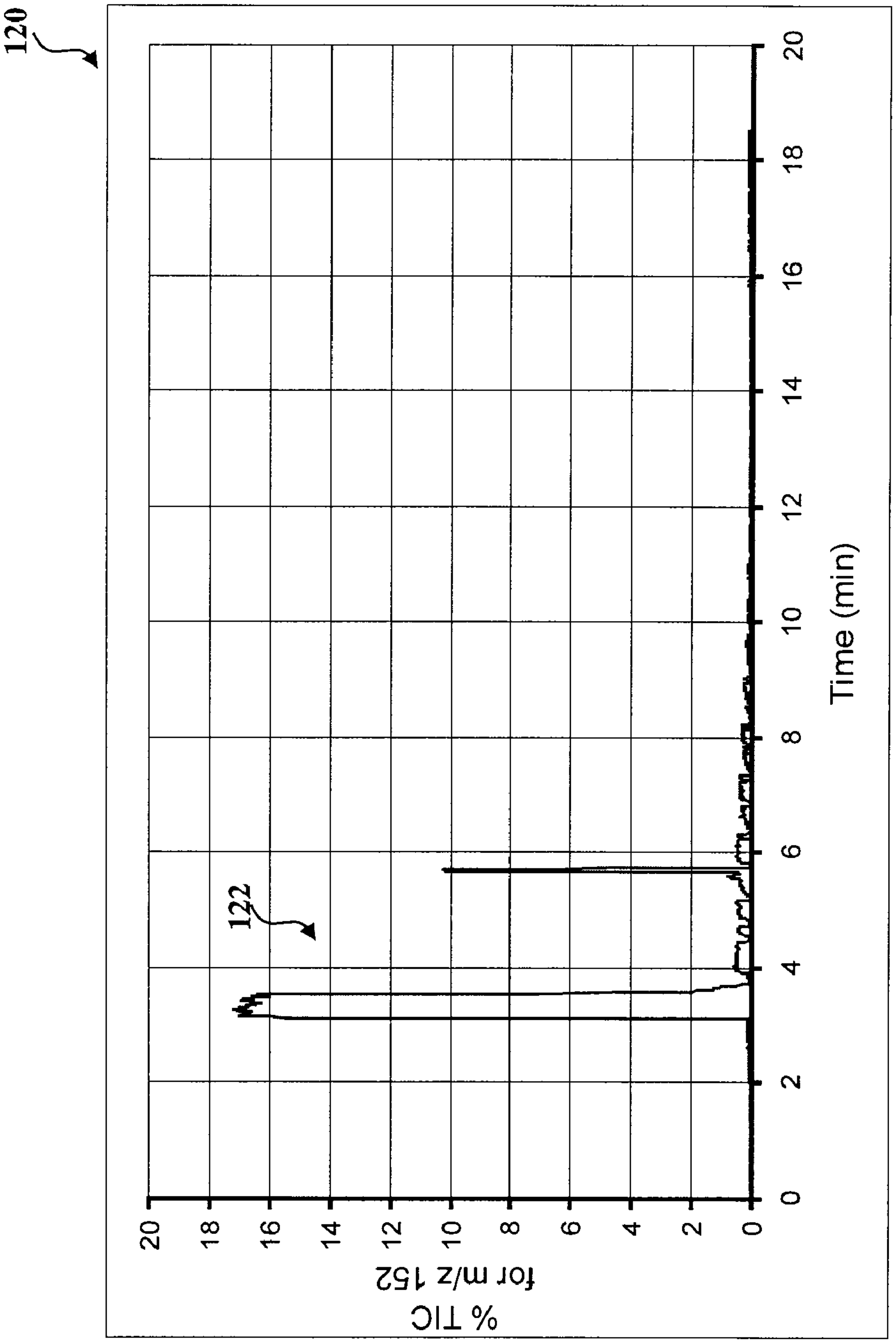

In the disclosed embodiment, an ion count for m/z 152 is determined during the analytical scans. FIG. 3 is a graph 110 showing a curve 112 that illustrates how ion count (intensity) of m/z 152 ($I_{m/z\ 152}$), from the AGC target ion population of the sample material, varies over time. In FIG. 3, the horizontal axis represents time in minutes, and the vertical axis represents ion count of m/z 152, in arbitrary units. Knowing the ion counts of m/z 152 ($I_{m/z\ 152}$) (FIG. 3) and the TIC (FIG. 2), a % TIC of m/z 152 (% $TIC_{m/z\ 152}$) can be determined using Equation (3). The % $TIC_{m/z\ 152}$ represents how much m/z 152 makes up the AGC target ion population of the sample material. FIG. 4 is a graph 120 showing a curve 122 that illustrates how the % TIC of m/z 152 varies over time. In FIG. 4, the horizontal axis represents time in minutes, and the vertical axis represents % TIC of m/z 152. Each point in the curve 122 of FIG. 4 is obtained by taking a corresponding point from the curve 112 of FIG. 3, a corresponding point from the curve 102 of FIG. 2, and using Equation (3) to calculate a value that is the point in curve 122. More specifically, each point in curve 122 (FIG. 4) represents the $I_{m/z\ 152}$ at a respective point in time (FIG. 3) divided by the TIC at the same point in time (FIG. 2).

Figure 5:
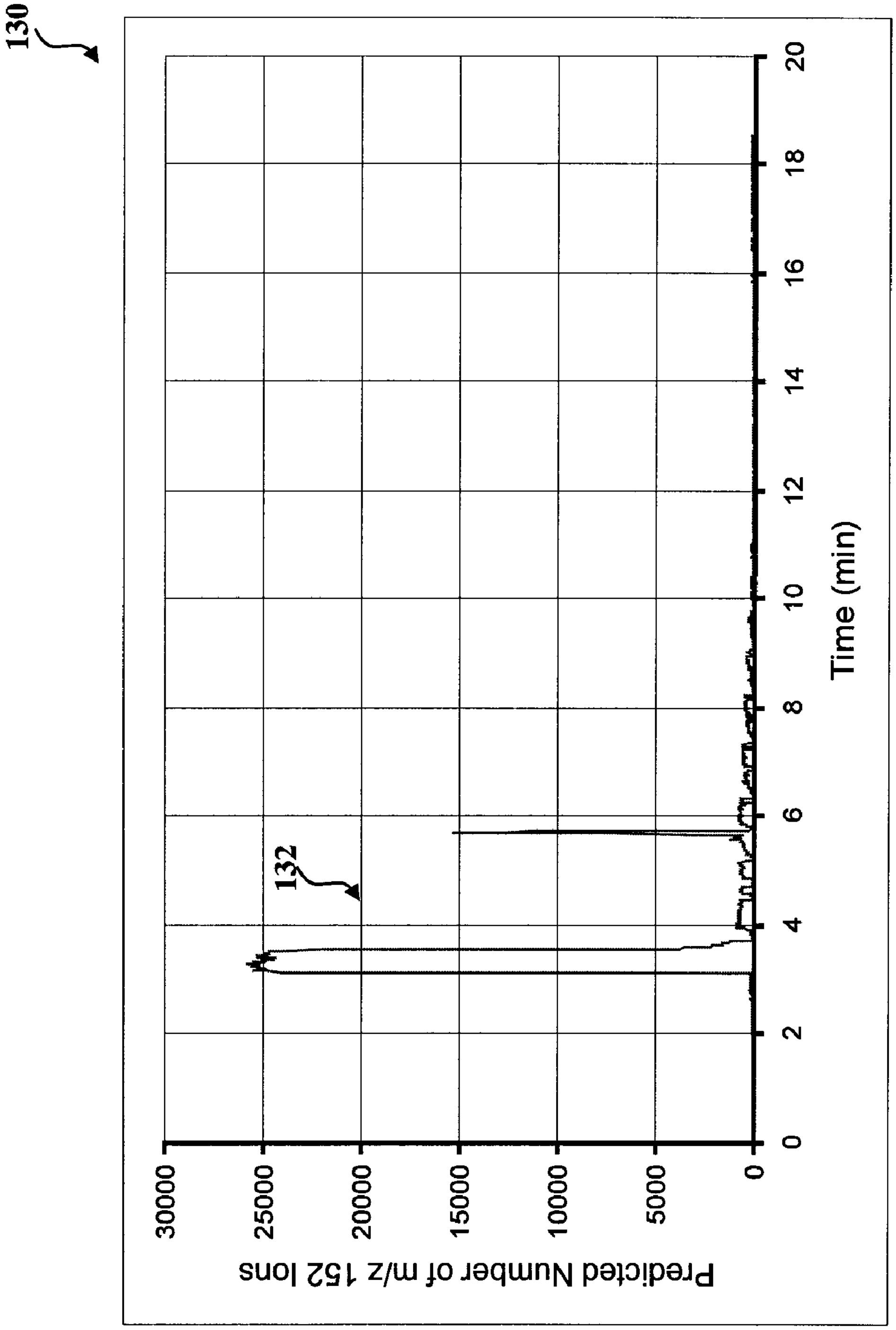

The predicted number of m/z 152 ions is then determined using Equation (4). In the disclosed embodiment, since each point on the curve 112 (FIG. 2) represents the intensity of 150,000 ions (because three micro-scans were performed), the predicted number of m/z 152 ions is determined by multiplying the % TIC by 150,000 ions, the "AGC target ion population," instead of the actual AGC target ion population of 50,000 ions. FIG. 5 is a graph 130 showing a curve 132 that illustrates how a predicted number of m/z 152 ions varies over time. In FIG. 5, the horizontal axis represents time in minutes, and the vertical axis represents the predicted number of m/z 152 ions. Each point in the curve 132 of FIG. 5 is obtained by taking a corresponding point from the curve 122 of FIG. 4, and using Equation (4) to calculate a value that is the point in curve 132. More specifically, each point in curve 132 represents the % $TIC_{m/z\ 152}$ at a respective point in time (FIG. 4) multiplied by 150,000 ions, the "AGC target ion population."

Figure 6:
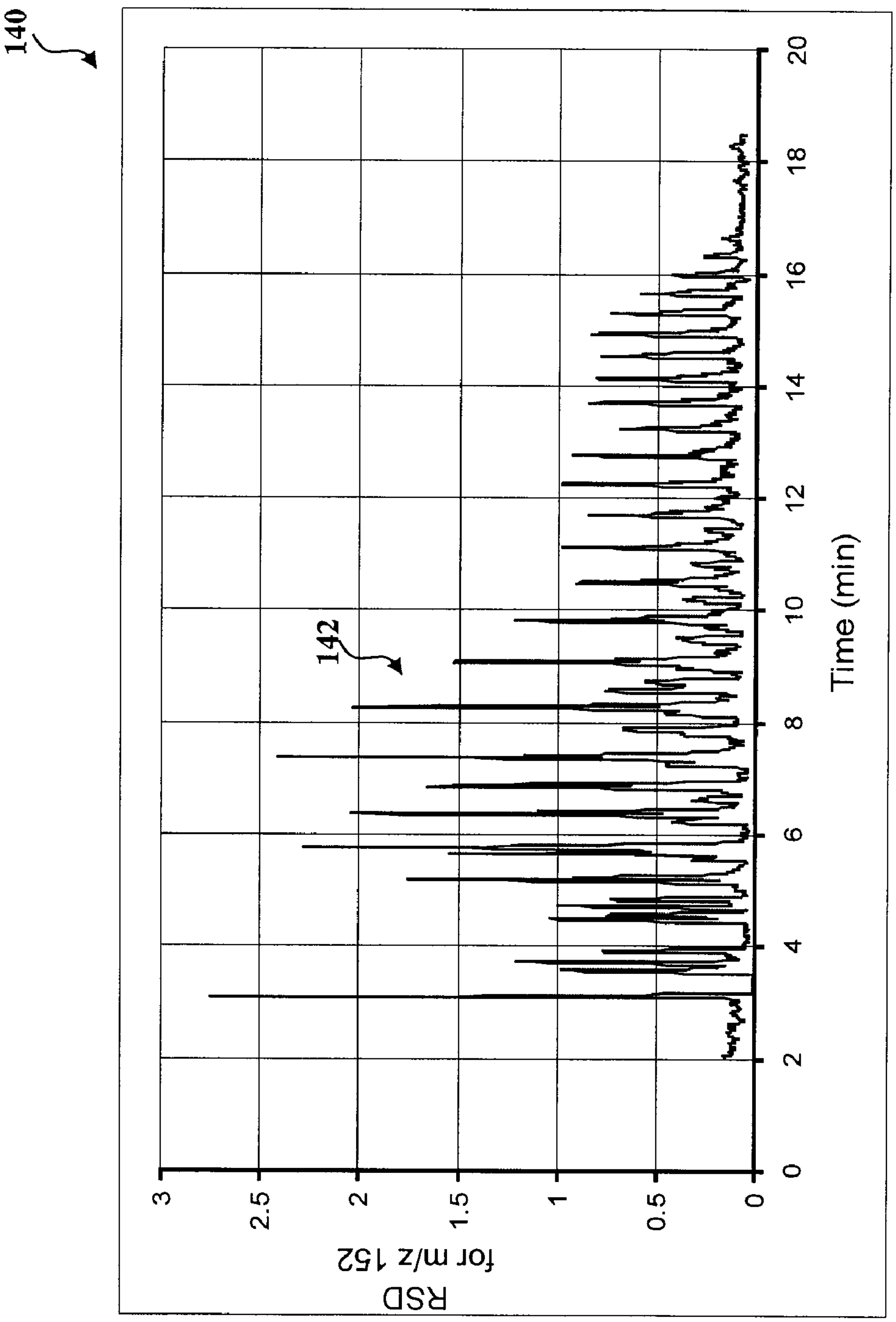

The foregoing discussion explains how to calculate a predicted number of ions for a particular m/z based on the number of ions known to be in the ion trap of the mass analyzer 14 as a result of AGC regulation. It is also possible to separately and statistically calculate a number of ions for the particular m/z. More specifically, a statistical number of the particular m/z ions is determined from the ion intensity of the particular m/z using the equation:

$$\text{Statistical Number of } m/z \text{ Ions} = \frac{1}{RSD^2_{m/z}} \tag{5}$$

where $RSD_{m/z}$ is a relative standard deviation of the ion intensity of the particular m/z. Standard deviation is determined by statistical techniques known in the art. FIG. 6 is a graph 140 showing a curve 142 that illustrates how an RSD of m/z 152 ions ($RSD_{m/z\ 152}$) varies over time. The curve 142 of FIG. 6 is derived from the curve 112 of FIG. 3 in a manner described below. In FIG. 6, the horizontal axis represents time in minutes, and the vertical axis represents the RSD of m/z 152 ions. Each point in the curve 142 represents a $RSD_{m/z\ 152}$ value at a respective point in time. In the disclosed embodiment, a sliding window is used to determine the $RSD_{m/z\ 152}$ value at each point in time. For example, each $RSD_{m/z\ 152}$ value is determined by determining a standard deviation of the ion count (intensity) of m/z 152 ($I_{m/z\ 152}$) in a 15 point window, and dividing the standard deviation by an average of the $I_{m/z\ 152}$ in that same 15 point window. More specifically, in FIG. 3, each point on the curve 112 represents an $I_{m/z\ 152}$ value. Starting from the origin of the graph 110, a standard deviation of the $I_{m/z\ 152}$ values for point 1 through point 15 is determined, and then divided by the average of the $L_{m/z\ 152}$ values for point 1 through point 15. The resulting $RSD_{m/z\ 152}$ value for point 1 through point 15 is then plotted as a point in the curve 142, being placed at a time coordinate that is in the middle of the 15 point window. Then, the sliding window is shifted one point to the right, and the $RSD_{m/z\ 152}$ value for point 2 through point 16 in curve 112 is determined, and so on, to successively determine all of the $RSD_{m/z\ 152}$ values that form curve 142. Alternatively, some other number of points for the sliding window could be used.

Figure 7:
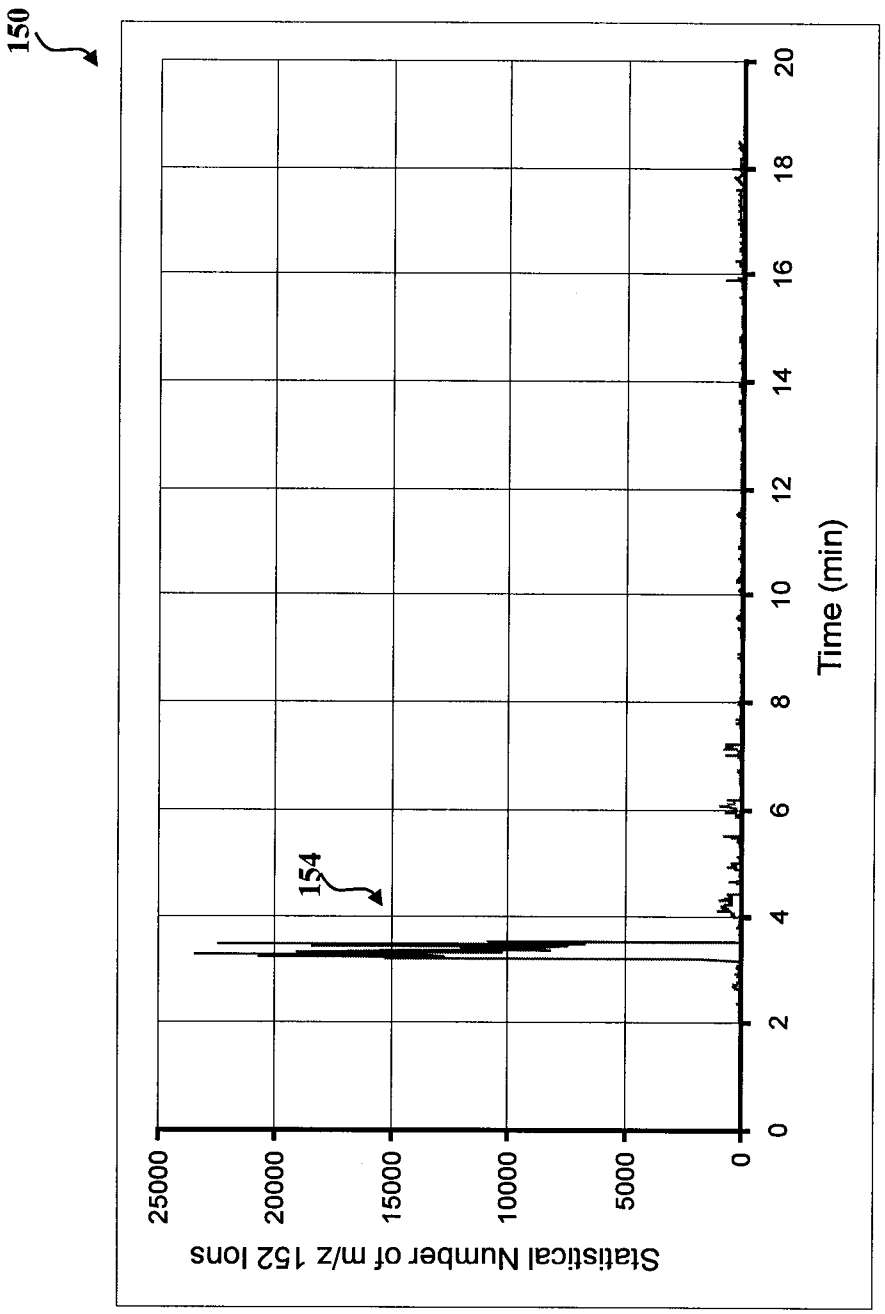

From the $RSD_{m/z\ 152}$, the statistical number of m/z 152 ions is then determined using Equation (5). FIG. 7 is a graph 150 showing a curve 154 that illustrates how a statistical number of m/z 152 ions varies over time. In FIG. 7, the horizontal axis represents time in minutes, and the vertical axis represents the statistical number of m/z 152 ions. Each point in the curve 154 of FIG. 7 is obtained by taking a corresponding point from the curve 142 of FIG. 6, and using Equation (5) to calculate a value that is plotted as the point in curve 154. That is, each point in curve 154 represents one divided by the square of $RSD_{m/z\ 152}$ at a respective point in time (FIG. 6).

Once the predicted number of ions and the statistical number of ions of the particular m/z have each been separately calculated in the manner discussed above, a gain ratio is determined for the particular m/z ($\text{Gain Ratio}_{m/z}$). The $\text{Gain Ratio}_{m/z}$ is determined by dividing the statistical number of ions of the particular m/z by the predicted number of ions of the particular m/z, represented by the equation:

$$\text{Gain } Ratio_{m/z} = \frac{\text{Statistical Number of } m/z \text{ Ions}}{\text{Predicted Number of } m/z \text{ Ions}} \tag{6}$$

As described above, the predicted number of ions is a calculated value determined using the ratio of $I_{m/z}$ to TIC (Equations 3 and 4). Both $I_{m/z}$ and TIC will be proportionally affected in the same manner by any change in detector gain, and so the calculated value of predicted number of ions is not affected by a change in detector gain. For example, if the detector gain decreases by 10%, $I_{m/z}$ and TIC will both decrease by 10%, and thus, these decreases will cancel out in the ratio of $I_{m/z}$ to TIC. Accordingly, although the predicted number of ions is a calculated value that can vary somewhat, the predicted number of ions is treated as corresponding conceptually with the target gain, since the predicted number of ions will not be affected by any change in the detector gain. In contrast, the statistical number of ions will change with a change in the detector gain. More specifically, as described above, if the detector gain decreases, then the AGC carried out by the controller 18 will assume that not enough ions were trapped in the mass analyzer 14. To compensate, the AGC opens the gate of the mass analyzer 14 longer than it should, thus causing the mass analyzer 14 to receive more ions than it should. Because more ions are trapped, more ions will be detected, and greater ion intensity measurements will lead to greater precision values. Accordingly, the RSD will decrease (because RSD is 1 divided by the square root of the number of ions detected). Consequently, because the statistical number of ions is 1 divided by RSD squared (Equation 5), a decrease in RSD will cause an increase in the statistical number of ions detected. Thus, a decrease in gain will thus cause an increase in the statistical number of ions, and vice versa. Since the $\text{Gain Ratio}_{m/z}$ effectively compares a value (statistical number of ions) that varies (inversely) with detector gain to a value (predicted number of ions) that does not vary with detector gain, the $\text{Gain Ratio}_{m/z}$, provides a percentage type value rather than an absolute value. The percentage type value of the $\text{Gain Ratio}_{m/z}$ is representative of an estimate of the actual gain of the detector 16 with respect to the particular m/z (whereas the absolute value would be representative of ions). Also, the data used to determine gain ratios may include data generated from different analytical scans involving different unknown samples. In this situation, using the percentage type value serves to normalize the results of multiple calculations (for example, for purposes of combining a number of gain ratio values calculated form different data drawn from different analytical scans that used different unknown samples). It should be noted that the $\text{Gain Ratio}_{m/z}$ could alternatively be expressed as a ratio of two gain values rather than two ion values, in which case, the ratio would be the predicted gain to the statistical gain.

Figure 8:
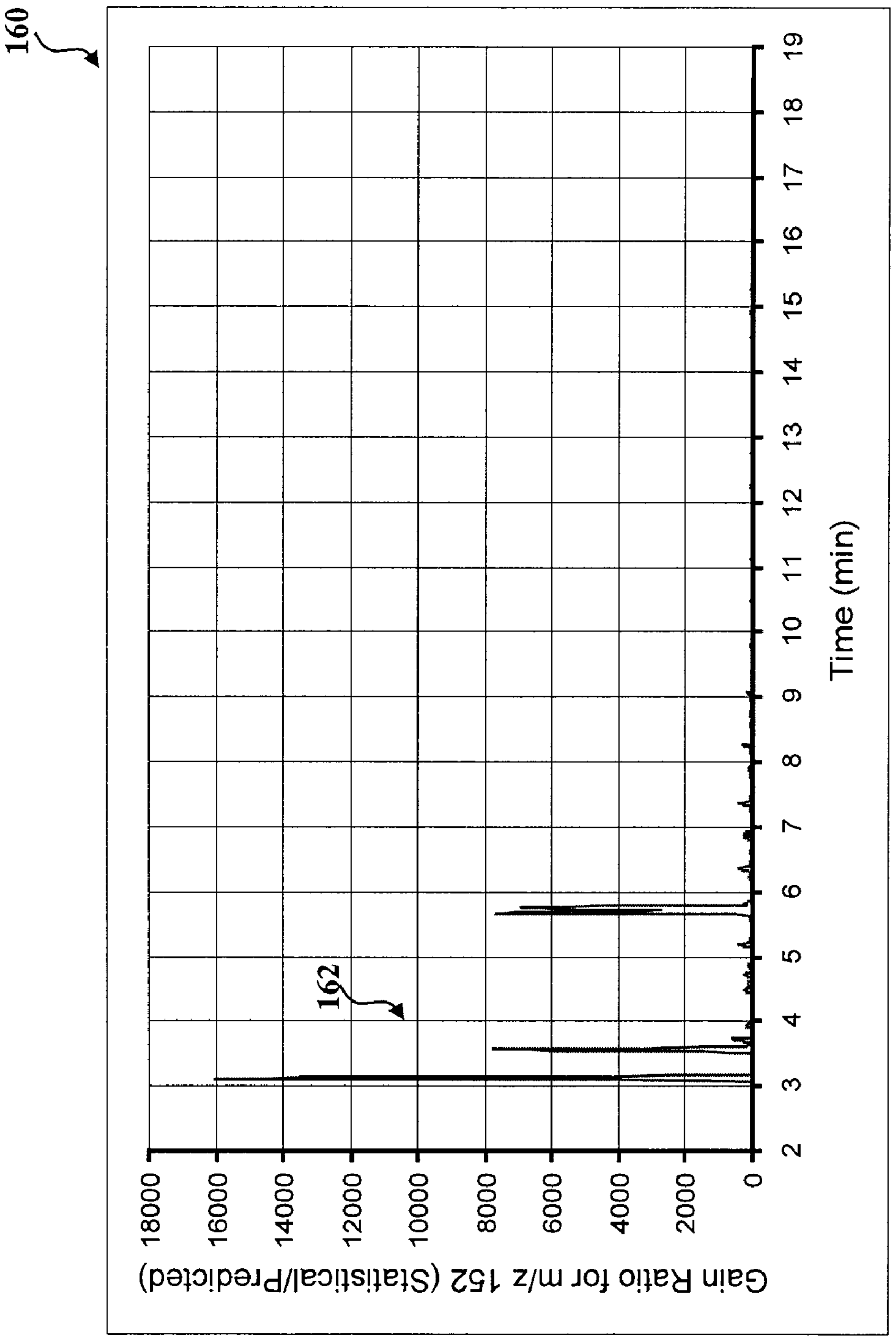

FIG. 8 is a graph 160 showing a curve 162 that illustrates how a gain ratio for m/z 152 ions varies over time. In FIG. 8, the horizontal axis represents time in minutes, and the vertical axis represents the gain ratio of m/z 152 ions. Each point in curve 162 of FIG. 8 represents a point from the curve 152 of FIG. 7 for a given point in time, divided by a point from the curve 132 of FIG. 5 for the same point in time. That is, each point in curve 162 represents the statistical number of m/z 152 ions at a point in time (FIG. 7) divided by the predicted number of m/z 152 ions at that same point in time (FIG. 5). Each point in curve 162 represents a respective gain ratio value for m/z 152 at a respective point in time.

Figure 9:
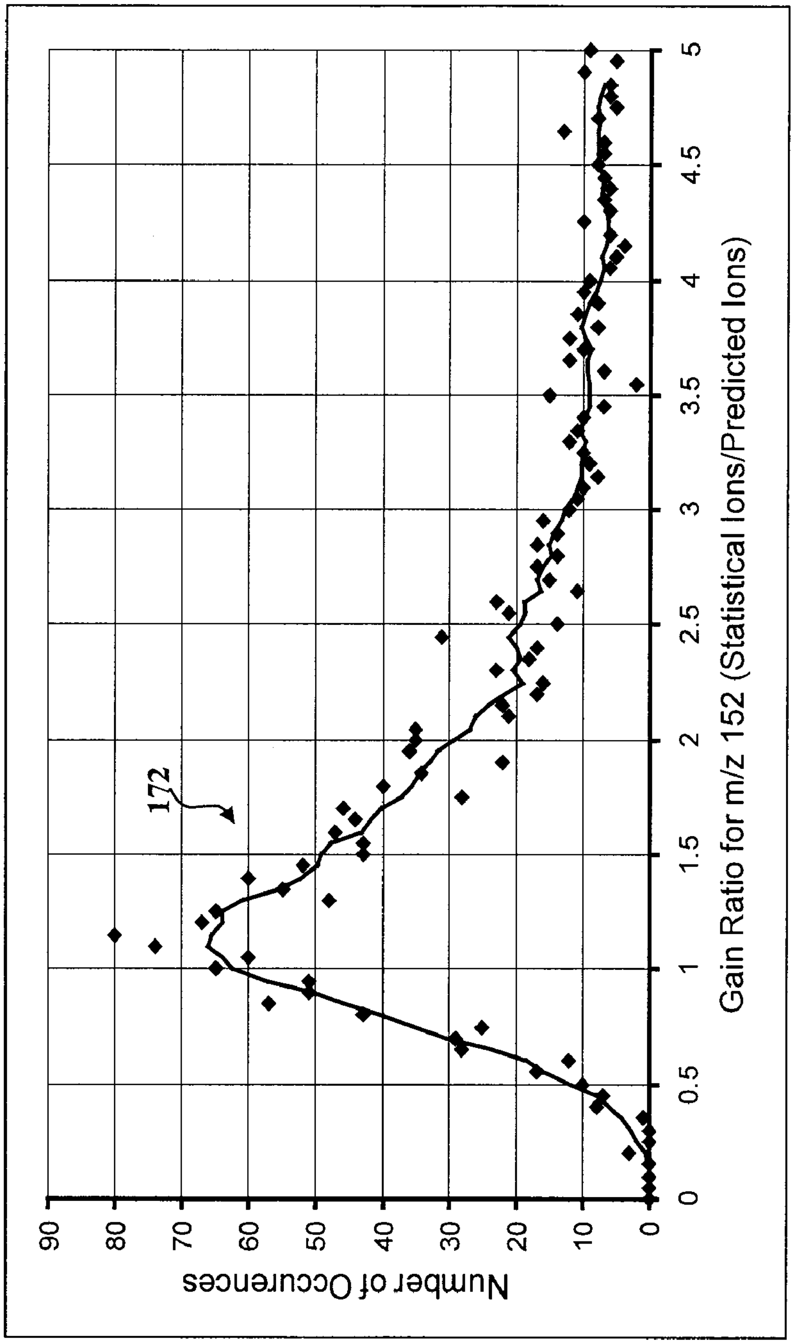

From all of the gain ratio values for m/z 152 in the curve 162, a gain ratio with respect to m/z 152 ($\text{Gain Ratio}_{m/z\ 152}$) can be determined in a variety of ways, the $\text{Gain Ratio}_{m/z\ 152}$ being representative of an estimate of the actual gain of the detector 16. In the disclosed embodiment, a histogram technique is used to determine a gain ratio that represents the estimated gain of the detector 16 with respect to the particular m/z. More specifically, a histogram of the gain ratios in curve 162 of FIG. 8 for m/z 152 is used to evaluate the number of occurrences of gain ratios for m/z 152 in various gain ratio ranges. For example, a linear binning method is used with gain ratio bins that are 0.05 wide, thus including a bin for gain ratios from 0 to 0.05, another bin for gain ratios from 0.05 to 0.10, and so on. Each gain ratio value represented as a point in the curve 162 is then classified into a respective bin. Then, in the disclosed embodiment, the number of gain ratios in the bins for the particular m/z are fit with a curve. For example, FIG. 9 is a graph 170 showing a plurality of data points that each represent the number of gain ratio values in a respective gain ratio bin for m/z 152. The data points are fit with a curve 172. In the disclosed embodiment, the data points are fit with the curve 172 by performing a seven point running average of the data points, using a sliding window. For example, each number of occurrences value in the curve 172 represents an average of the number of occurrences values in a 7 point window. More specifically, in FIG. 9, each data point in graph 170 represents a number of occurrences value. Starting from the origin of the graph 170, an average of the number of occurrences values for data point 1 through data point 7 of FIG. 9 is determined. The average number of occurrences value for point 1 through point 7 is then plotted as a point in the curve 172, being placed at a gain ratio coordinate that is in the middle of the 7 point window. Then, the sliding window is shifted one point to the right, and the average number of occurrences value for data point 2 through data point 8 of FIG. 9 is determined and plotted, and so on, to determine all of the values that form curve 172. Alternatively, some other number of points for the averaging and sliding window could be used.

A gain ratio value that occurs the most is then determined from curve 172 with respect to m/z 152. This gain ratio value is treated as the Gain Ratio$_{m/z\ 152}$. In the disclosed embodiment, a peak of the curve 172 represents the Gain Ratio$_{m/z\ 152}$. For example, the peak of the curve 172 is a gain ratio value of about 1.1. As noted above, the gain ratio represents an inversely-varying estimate of the actual gain of the detector 16. In the disclosed embodiment, the Gain Ratio$_{m/z\ 152}$ of 1.1 means that the actual detector gain is estimated to be approximately 0.9 times the target gain.

Figure 10:
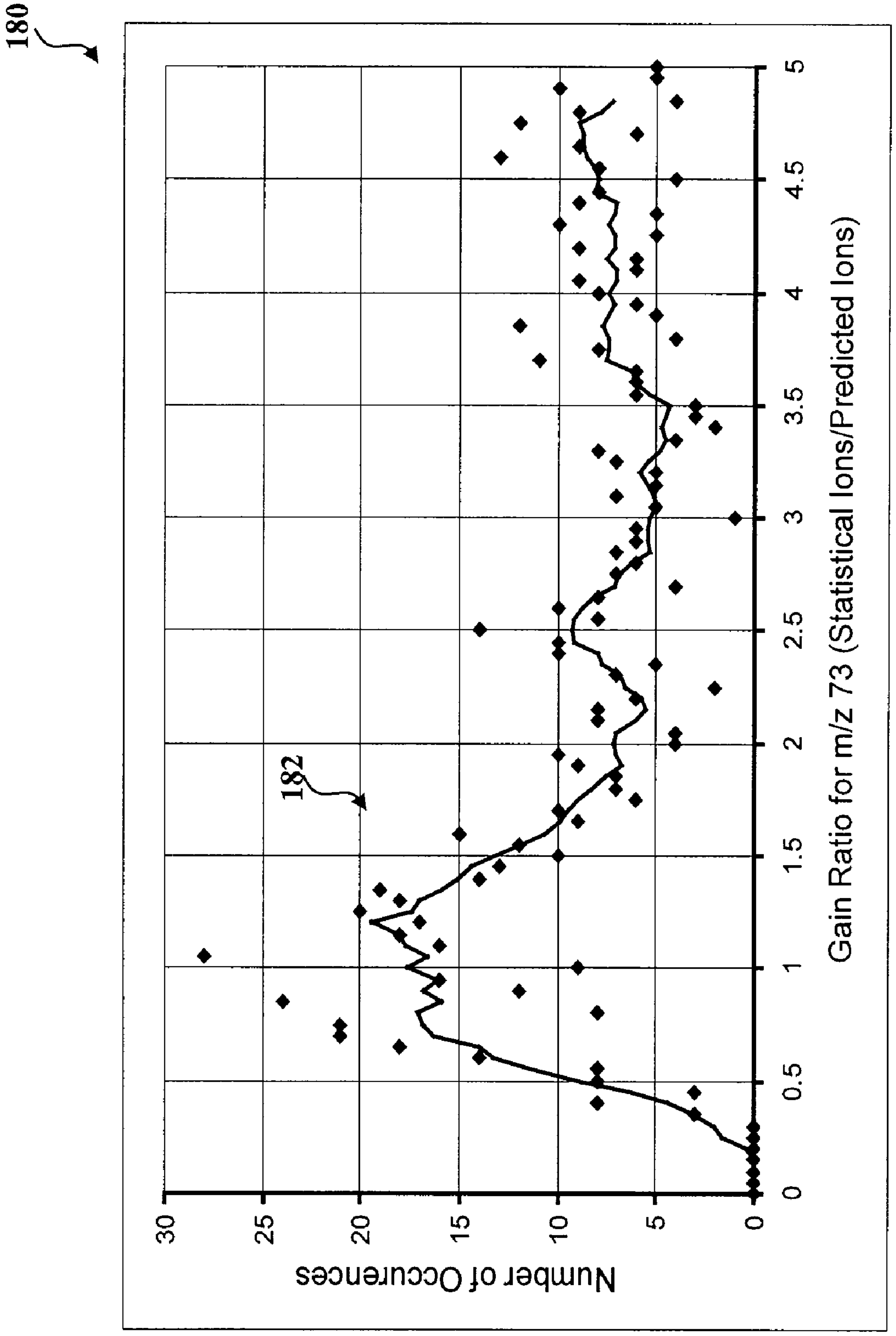
Figure 11:
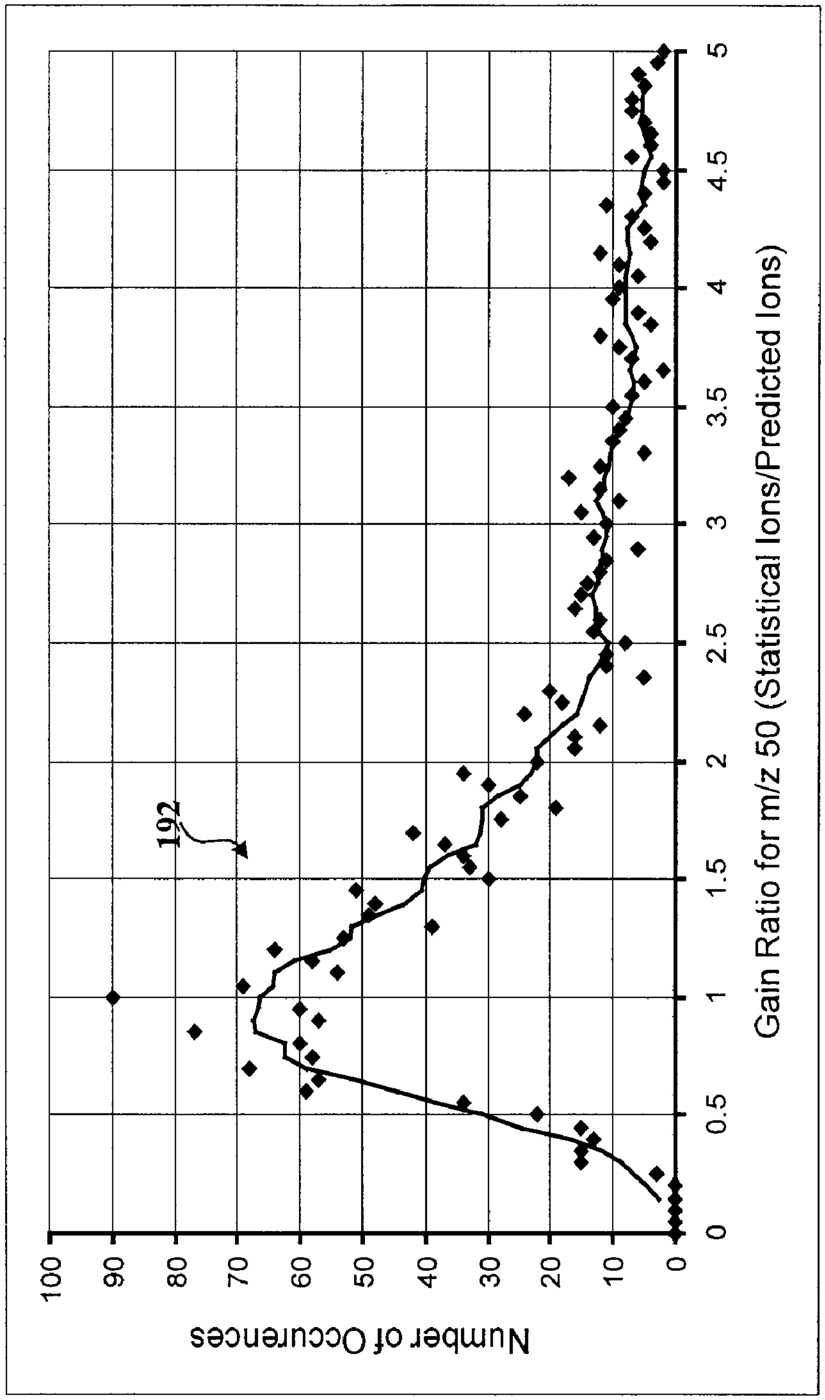
Figure 12:
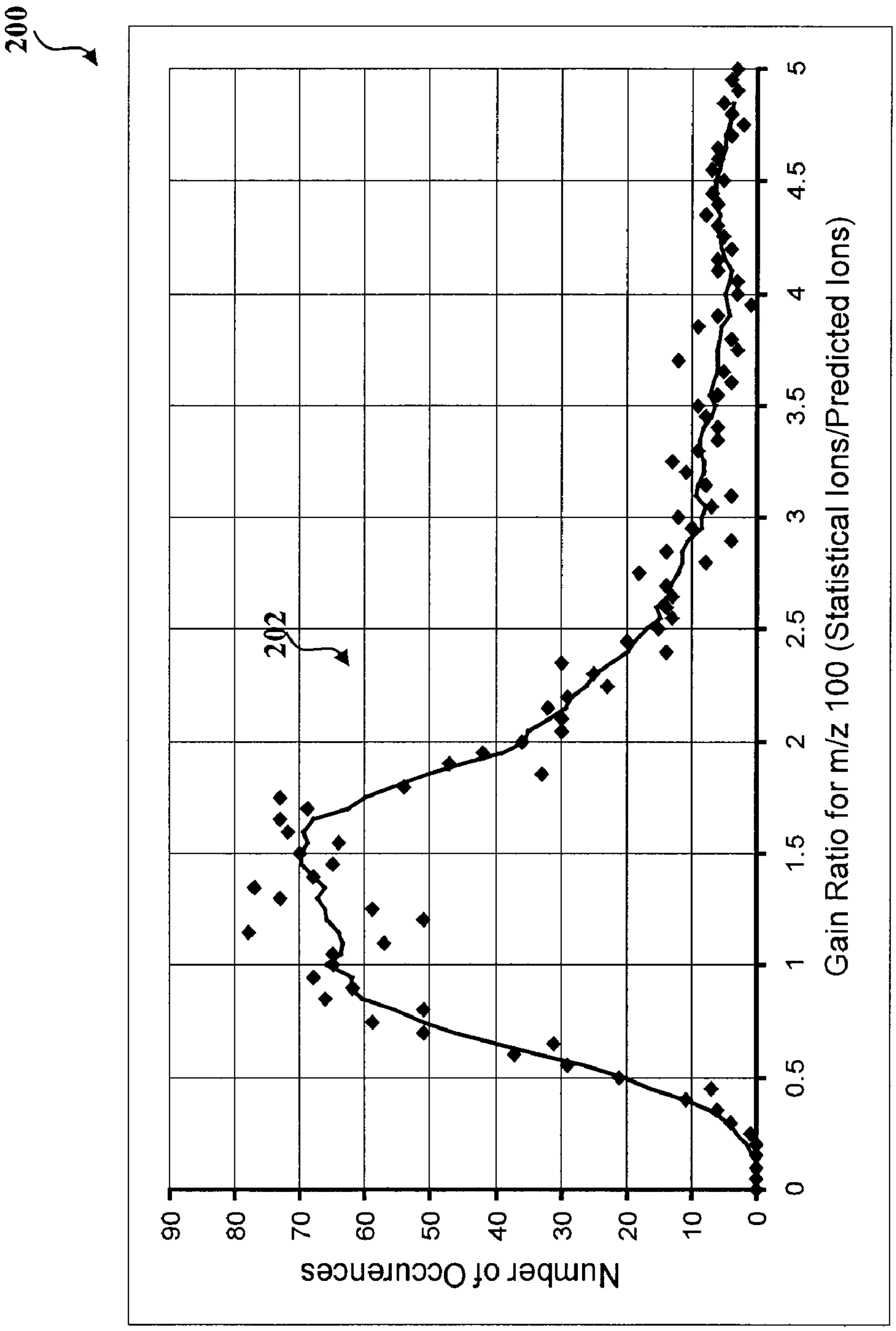

Because different m/z ions impact the detector 16 with different velocities, other m/z ions detected during the analytical scans will exhibit different estimated gain measurements than m/z 152. Accordingly, gain ratios for the detector 16 are determined for each of many different m/z ions in a manner similar to m/z 152. FIG. 10 is a graph 180 similar to FIG. 9 but showing data points representing a number of gain ratio values in respective gain ratio bins for m/z 73 that are fit with a curve 182. FIG. 11 is a graph 190 similar to FIG. 9 but showing data points representing a number of gain ratio values in respective gain ratio bins for m/z 50 that are fit with a curve 192. FIG. 12 is a graph 200 similar to FIG. 9 but showing data points representing a number of gain ratio values in respective gain ratio bins for m/z 100 that are fit with a curve 202. The data associated with FIGS. 10-12 are generated similarly to the data associated with FIG. 9, discussed above with respect to m/z 152. Respective detector gain ratios for each of m/z 73, m/z 50, and m/z 100 are determined from the peaks of the curves 182, 192, and 202, respectively. For example, from the peaks of the curves 172, 182, 192, and 202, peak gain ratios of 1.1, 1.0, 0.95, and 1.3 are determined, respectively.

From the peak gain ratios for the different m/z ions, an average of the peak gain ratios with respect to the different m/z ions is determined. When determining the average of the peak gain ratios, some peak gain ratios can be ignored if it is determined that they are too far away from a target gain ratio (for example, more than two times the target gain ratio), or if a peak from the curve does not meet some criteria, for example, the peak has too broad of a distribution, such as the curve 202 in FIG. 12. More specifically, some m/z ions provide unreliable peak gain ratios, and are thus not suitable for use in determining the gain ratio for the various m/z ions. For example, some m/z ions may exhibit unusually high intensities, indicating that these m/z ions represent a large number of ions and negating the assumption that the precision of the intensity measurements is ion statistics limited. These m/z ions are thus disregarded when determining the average gain ratio (for the various m/z ions) of the peak gain ratios. Further, some m/z ions may exhibit large numbers due to eluting chromatographic peaks, indicating that the changing signal from the chromatographic peaks controls the precision of the intensity measurements, instead of the number of ions. The data from these m/z ions is not considered ion statistics limited, and these m/z ions are thus disregarded when determining the gain ratio for the various m/z ions. In the disclosed embodiment, the peak gain ratio of 1.3, determined for the curve 202 in FIG. 12, is not consistent with the peak gain ratios of 1.1, 1.0, and 0.95, determined from the curves 172, 182, and 192, respectively. Accordingly, the peak gain ratio of 1.3 from curve 202 is ignored in determining the average gain ratio. An average of the peak gain ratios for m/z 152, ink 73 and m/z 50 is a gain ratio of about 1.02. The average gain ratio 1.02 is the gain ratio for the various multiple m/z ions (Gain Ratio$_{m/z\ multiple}$), and is thus representative of the estimated gain of the detector 16. Alternatively, a histogram technique or other statistical technique could be implemented to arrive at a gain ratio for the different m/z ions. For example, by using a large number of m/z ions, histogramming the peak gain ratios for each m/z ion could be used to determine the most likely gain ratio, which would then be the Gain Ratio$_{m/z\ multiple}$.

The gain ratio for the various m/z ions (Gain Ratio$_{m/z\ multiple}$) is then compared to a target gain ratio. An assumption is made that the target gain corresponds with a target gain ratio of about 1.0. Thus, the Gain Ratio$_{m/z\ multiple}$ (the average peak gain ratio of the various m/z, here 1.02) is compared to the target gain ratio of about 1.0. The detector gain ratio for the various m/z ions and target gain ratio are compared by determining a gain ratio difference using the following equation:

$$\text{Gain Ratio Difference} = \text{Gain Ratio}_{m/z\ multiple} - \text{Target Gain Ratio} \quad (7)$$

In the disclosed embodiment, the gain ratio difference is 0.02 (the gain ratio for the various m/z ions, 1.02, minus the target gain ratio, 1.0). The estimated gain of the detector 16 is thus about 2% too low, which suggests the actual gain of the detector 16 may also be 2% too low. (Note that, as discussed above, the gain ratio varies inversely with the detector gain, such that an increase in the Gain Ratio$_{m/z\ multiple}$ indicates a decrease in detector gain). Based on the gain ratio difference, it is determined whether the Gain Ratio$_{m/z\ multiple}$ falls outside a tolerance or threshold from the target gain ratio. For example, if the tolerance is ±0.1 (10%) from the target gain ratio of 1.0, the gain ratio difference of 0.02 indicates that the gain of the detector 16 is at an acceptable level. The operation of the mass spectrometer 10 can thus continue without recalibrating the detector 16. However, if the Gain Ratio$_{m/z\ multiple}$ falls outside the tolerance, the gain of the detector 16 is automatically adjusted by the controller 18. For example, assuming that the gain difference of 0.02 falls outside the threshold or tolerance from the target gain ratio, the controller 18 determines how the detector 16 needs to be adjusted to compensate for the gain change. In the disclosed embodiment, the adjustment is based on the gain ratio difference, and on a dilution factor, such as a time constant. The dilution factor compensates for any imprecision in the estimated gain measurements, and adds a time constant that provides damping to prevent radical changes to the operating parameter of the detector 16 that influences the gain (for example, the multiplier voltage provided at output 44 to EM 21) in the event of a few inaccurate estimated gain measurements. The dilution factor is determined based on how often measurements are made with the mass spectrometer 10 and how fast it is assumed that the detector gain changes over time. For example, if measurements occur once an hour, it can be assumed that the gain of the detector 16 will not change much in one day, and a dilution factor of 24 could be appropriate. Higher dilution factors could be used when measurements are taken more often.

When the dilution factor is included, the gain ratio difference is divided by the dilution factor to determine the diluted gain ratio difference, for example, by the equation:

$$\text{Diluted Gain Ratio Difference} = \frac{\text{Gain Ratio Difference}}{\text{Dilution Factor}} \tag{8}$$

In the disclosed embodiment, a dilution factor of 10 is used, and thus, the diluted gain ratio difference is about 0.002 (0.2%) using Equation (8). The controller 18 then adjusts the multiplier voltage of the detector 16 to bring the detector gain back toward the target gain or within the tolerance of the target gain based on the diluted gain ratio difference. In particular, the controller 18 can bump up the gain of the detector 16 by about 0.2% after determining that the gain is about 2% too low. In the disclosed embodiment, the controller 18 automatically adjusts the multiplier voltage of the EM 21 to bring the detector gain closer to the target gain. Thus, the controller 18 adjusts voltage output 44 to the EM 21 to adjust the multiplier voltage to achieve a detector gain about 0.2% higher. The automatic gain adjustment can be made at any time, for example, after each analytical scan, at the end of each day, at the end of a batch of scans, or even during the analytical scans. The automatic gain adjustment can also be made at other times, and can be made almost continuously based on the continuous estimated gain measurements.

Alternatively, instead of performing an automatic gain adjustment after determining whether the gain ratio difference is outside the tolerance or threshold, the controller 18 could generate a warning via the user interface 32 to a user of the mass spectrometer 10. The warning can include a visual, audible, or other sensory type warning. For example, the user interface 32 can include a computer having a display device for displaying information, such as the warning, to the user. The displayed warning indicates that the gain of the detector 16 is not at an acceptable value and asks the user whether the detector gain should be adjusted. The user can then tell the controller 18 to automatically adjust the gain, or request that the detector gain be adjusted at a later time and not at the time of the warning. For example, the user can interact with the controller 18 via the user interface 32 that includes the display device and a keyboard, pointing device, such as a mouse or a trackball, or some other device that allows the user to provide input to the controller 18.

Alternatively, instead of using the histogram technique described above, the gain ratio that represents the estimated gain of the detector 16 with respect to a particular m/z (Gain $\text{Ratio}_{m/z}$) could be determined by an averaging or median technique. In determining an average and median, some of the gain estimates (gain ratios) are treated as being obviously wrong. As discussed above, eluting chromatographic peaks can produce obviously-wrong gain ratios that can in turn result in gain overestimates if not discarded. In the disclosed embodiment, it is assumed that the target gain corresponds with a target gain ratio of about 1.0. Accordingly, any gain ratios that are at least two times (2×) the target gain ratio of 1.0 are treated as overestimates, and are disregarded when using an average or median to determine the gain ratio with respect to the particular m/z. For example, an average of the gain ratio values under 2.0 for m/z 152 could be determined, this average gain ratio being the gain ratio of the detector 16 with respect to m/z 152 (Gain $\text{Ratio}_{m/z\ 152}$). Or, a median of the gain ratios under 2.0 for m/z 152 could be determined, the median gain ratio being the gain ratio of the detector 16 with respect to m/z 152. Then the average gain ratios or median gain ratios for various m/z could be combined in the manner discussed earlier in order to obtain a gain ratio for the various m/z ions (Gain $\text{Ratio}_{m/z\ multiple}$).

The foregoing discussion explains how to estimate the gain of the detector 16 when the mass analyzer 14 includes a trapping instrument. As noted above, the mass analyzer 14 could alternatively be a non-trapping, beam instrument, which does not involve the use of the AGC technique described above. With some modifications, the detector gain monitoring described above can also be performed when the mass analyzer 14 is a beam instrument. In this situation, the statistical number of ions of the particular m/z, such as m/z 152, is still determined as described above. The statistical number of ions of the particular m/z (FIG. 7) is then used to determine a statistical gain with respect to the particular m/z (Statistical $\text{Gain}_{m/z}$), by using the following equation:

$$\text{Statistical } Gain_{m/z} = \frac{\text{Ion Intensity } Area_{m/z} \cdot ElectrometerGain \cdot \text{Scan Rate}}{\text{Statistical Number of } Ions_{m/z} \cdot K} \tag{9}$$

where Ion Intensity $\text{Area}_{m/z}$ is the ion intensity area for the particular m/z, Electrometer Gain is a known gain (in pA/ion count) of the circuitry 22 (including the electrometer and associated electronic circuitry) that contributes to the gain of the detector 16, Scan Rate is the scan rate (in msec/a.m.u.) used during the analytical scans, K is a constant that is dependent on numerous instrument-specific parameters, pA is current in pico amperes, and a.m.u. is atomic mass units. The Ion Intensity $\text{Area}_{m/z}$ is the integrated area under the ion intensity curve for the particular m/z. Similar to the methods described above, the statistical gain with respect to the particular m/z over time is determined.

The target gain is then compared to the statistical gain for the particular m/z over time to determine a gain ratio for the particular m/z over time, by the following equation:

$$\text{Gain } Ratio_{m/z} = \frac{\text{Target Gain}}{\text{Statistical } Gain_{m/z}} \tag{10}$$

where the target gain is the calibrated gain of the detector 16 that was set during the initial calibrations, which occurred before the analytical runs that generated data for an unknown sample. Similar to the trapping instrument, the gain ratios of the particular m/z over time can be histogrammed, averaged, or medianed to determine a final gain ratio for the particular m/z that represents an estimated gain of the detector 16 with respect to the particular m/z. As further described above with reference to the trapping instrument, based on the gain ratios of the detector 16 for various m/z ions, a gain ratio for the various ions (Gain $\text{Ratio}_{m/z\ multiple}$) of the detector 16 is then determined and compared to the target gain ratio. In this situation, in contrast to the gain ratios determined from the number of ions, it should be noted that the value that varies with the detector gain is now the denominator (Statistical $\text{Gain}_{m/z}$) and the non-varying reference value is the numerator (Target Gain). Accordingly, the gain ratio for the various m/z also varies inversely to the actual change in gain of the detector 16. For example, a 10% decrease in actual gain will yield a gain ratio of 1.1. And, an automatic gain adjustment is made, or a user-perceptible warning is generated, if the gain ratio for the various m/z is not an acceptable value.

Figure 13:
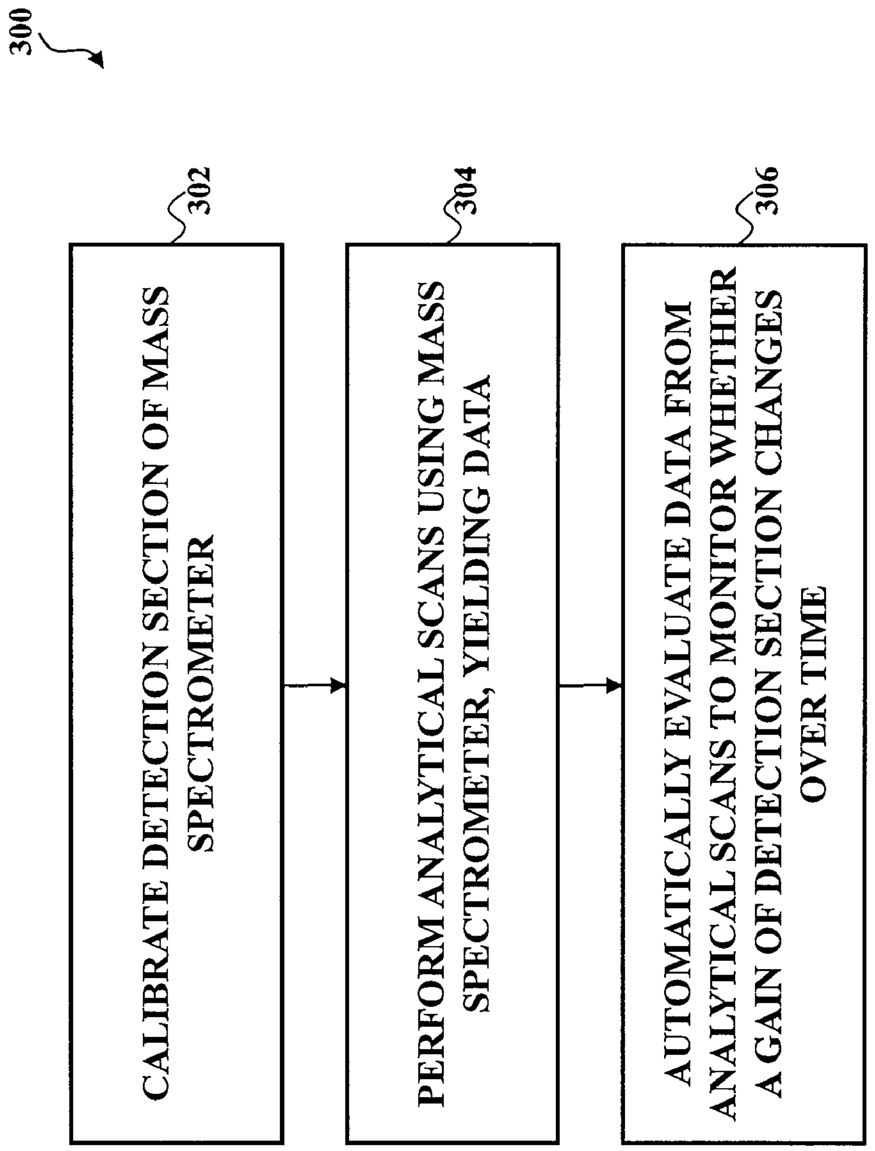
FIG. 13 is a flowchart of a method of operating the mass spectrometer of FIG. 1 according to various aspects of the present invention.

FIG. 13 is a high-level flowchart 300 depicting the gain monitoring techniques described above. At block 302, a detection section of a mass spectrometer, such as the detector 16 of the mass spectrometer 10 of FIG. 1, is calibrated. At block 304, analytical scans for an unknown sample are performed using the mass spectrometer. The analytical scans yield data, such as the data used to generate FIGS. 2-12. For example, in an embodiment as described above, the data includes ion intensities for a range of m/z of the AGC target ion population. At block 306, the data from the analytical scans is automatically evaluated to monitor whether a gain of the detection section changes over time. For example, the controller 18 of the mass spectrometer 10 evaluates the data generated during operation of the mass spectrometer 10, and monitors whether a gain of the detector 16 changes over time based on the evaluated data. As described above, an estimated gain can be determined from the data, and an automatic gain adjustment can be made, or other appropriate action can be taken, if the estimated gain is not an acceptable value.

Although several embodiments have been discussed in detail, it will be understood that a variety of substitutions and alterations are possible without departing from the spirit and scope of the present invention, as defined by the following claims.

What is claimed is:

1. A method comprising:

performing a plurality of analytical scans during normal operation of a mass spectrometer having a detection section, wherein data is generated during the analytical scans in a manner that includes use of the detection section; and automatically evaluating the data from the analytical scans to monitor whether an actual gain of the detection section changes over time.

2. A method according to claim 1, wherein before the performing the plurality of analytical scans, the actual gain is approximately equal to a target gain; and wherein the automatically evaluating includes determining an estimated gain from the data, the estimated gain being an estimate representative of the actual gain, and evaluating whether the estimated gain falls outside a predetermined gain tolerance from the target gain.

3. A method according to claim 2, wherein the detection section has an operating parameter that influences the actual gain; and including automatically adjusting the operating parameter of the detection section if the estimated gain falls outside the predetermined gain tolerance.

4. A method according to claim 3, wherein the automatically adjusting includes determining an adjustment amount for the operating parameter, the adjustment amount being a function of a difference between the estimated gain and the target gain.

5. A method according to claim 4, wherein the determining the adjustment amount includes factoring a dilution factor into the adjustment amount.

6. A method according to claim 3, wherein the detection section has a control input that receives a control signal having a characteristic that is the operating parameter; and wherein the automatically adjusting includes determining an adjustment amount for the characteristic of the control signal.

7. A method according to claim 2, including generating an operator perceptible alert in response to the evaluating the estimated gain if the estimated gain falls outside the predetermined gain tolerance.

8. A method according to claim 1, wherein the data includes ion intensities of a plurality of mass-to-charge ratios; and the automatically evaluating includes analyzing the ion intensities of the plurality of mass-to-charge ratios.

9. A method according to claim 1, wherein the mass spectrometer includes a mass analyzer section, and an ion source section that directs an ion beam having an ion beam intensity into the mass analyzer section;

wherein the performing the analytical scans includes separating ions of the ion beam in the mass analyzer section according to a plurality of mass-to-charge ratios, and determining an ion intensity of each of the plurality of mass-to-charge ratios using the detection section; and including, before the performing the analytical scans, adjusting the ion beam intensity, such that the ion beam intensity is ion statistics limited, and calibrating the detection section, such that the actual gain is approximately equal to a target gain.

10. A method according to claim 9, wherein the evaluating includes:

determining from the data an estimated gain of the detection section, the estimated gain being an estimate representative of the actual gain; and comparing the estimated gain to the target gain.

11. A method according to claim 10, wherein the determining the estimated gain includes for each mass-to-charge ratio:

determining a relative standard deviation as a function of the ion intensity of the mass-to-charge ratio; and determining a statistical number of ions for the mass-to-charge ratio as a function of the relative standard deviation.

12. A method according to claim 11, wherein the performing the analytical scans includes determining a total ion intensity of the plurality of mass-to-charge ratios; and wherein the determining the estimated gain includes for each mass to-charge ratio:

determining a predicted number of ions of the mass-to-charge ratio as a function of the total ion intensity, and comparing the statistical number of ions to the predicted number of ions, thereby determining a gain ratio for the mass-to-charge ratio.

13. A method according to claim 12, wherein the determining the estimated gain includes deriving the estimated gain from the gain ratios for the plurality of mass-to-charge ratios.

14. A method according to claim 11, wherein the determining the estimated gain includes for each mass-to-charge ratio:

determining a statistical gain based on the statistical number of ions; and comparing the statistical gain to the target gain, thereby determining a gain ratio for the mass-to-charge ratio.

15. A method according to claim 14, wherein the determining the estimated gain includes deriving the estimated gain from the gain ratios for the plurality of mass-to-charge ratios.

16. An apparatus comprising a mass spectrometer that includes:

a detection section having an actual gain; and a control section that, during normal operation of the mass spectrometer:

causes the mass spectrometer to perform a plurality of analytical scans that generate data in a manner that includes use of the detection section, and automatically evaluates the data from the analytical scans to monitor whether the actual gain of the detection section changes over time.

17. An apparatus according to claim 16, wherein the detection section has an operating parameter that influences the actual gain;

wherein before performing the plurality of analytical scans, the control section adjusts the operating parameter such that the actual gain is approximately equal to a target gain; and wherein the control section that automatically evaluates:

determines an estimated gain from the data, the estimated gain being an estimate representative of the actual gain, and evaluates whether the estimated gain falls outside a predetermined gain tolerance from the target gain.

18. An apparatus according to claim 17, wherein the control section automatically adjusts the operating parameter of the detection section if the estimated gain falls outside the predetermined gain tolerance.

19. An apparatus according to claim 18, wherein the detection section includes an electron multiplier having a multiplier voltage, the operating parameter being the multiplier voltage.

20. An apparatus according to claim 17, including a user interface section, wherein the control section generates an operator perceptible alert to the user interface if the estimated gain falls outside the predetermined gain tolerance.

* * * * *